United States Patent
Sugishita et al.

(10) Patent No.: US 10,658,683 B2
(45) Date of Patent: May 19, 2020

(54) METHOD FOR PRODUCING ELECTROLYTE MEMBRANE ELECTRODE ASSEMBLY FOR FUEL CELLS

(71) Applicant: HONDA MOTOR CO., LTD., Minato-Ku, Tokyo (JP)

(72) Inventors: Masashi Sugishita, Wako-Shi (JP); Daisuke Okonogi, Wako-Shi (JP); Yoshihito Kimura, Wako-Shi (JP); Yukihito Tanaka, Wako-Shi (JP)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 15/857,807

(22) Filed: Dec. 29, 2017

(65) Prior Publication Data

US 2018/0145359 A1    May 24, 2018

Related U.S. Application Data

(62) Division of application No. 14/008,193, filed as application No. PCT/JP2012/057507 on Mar. 23, 2012, now abandoned.

(30) Foreign Application Priority Data

Apr. 1, 2011 (JP) .................................. 2011-082175
Jun. 17, 2011 (JP) .................................. 2011-134851

(51) Int. Cl.
*H01M 8/0276* (2016.01)
*H01M 8/0267* (2016.01)
(Continued)

(52) U.S. Cl.
CPC ....... *H01M 8/0276* (2013.01); *H01M 8/0267* (2013.01); *H01M 8/0271* (2013.01);
(Continued)

(58) Field of Classification Search
None
See application file for complete search history.

(56) References Cited

U.S. PATENT DOCUMENTS

| 2006/0127738 A1 | 6/2006 | Sompalli et al. |
| 2006/0166075 A1 | 7/2006 | Inoue et al. |
| 2011/0045380 A1 | 2/2011 | Suzuki et al. |

FOREIGN PATENT DOCUMENTS

| DE | 11 2005 002 974 T5 | 10/2007 |
| JP | 2005-085594 A | 3/2005 |

(Continued)

*Primary Examiner* — Daniel S Gatewood
(74) *Attorney, Agent, or Firm* — Carrier Blackman & Associates, P.C.; Joseph P. Carrier; Anne G. Sabourin

(57) ABSTRACT

A method for preparing a fuel cell membrane electrode assembly, where the membrane electrode assembly includes a solid polymer electrolyte membrane and a first electrode and a second electrode provided on both sides of the solid polymer electrolyte membrane. The first electrode and the second electrode each include an electrode catalyst layer and a gas diffusion layer. The method includes forming the first electrode and the second electrode on both sides of the solid polymer electrolyte membrane, providing a preformed resin frame member around the solid polymer electrolyte membrane, overlapping an outer marginal portion of the first electrode and an inner marginal portion of the resin frame member with each other and applying heat and pressure to the overlapped portions of the first electrode and the resin frame member to join the resin frame member around the solid polymer electrolyte membrane.

3 Claims, 19 Drawing Sheets

(51) Int. Cl.
  *H01M 8/0271* (2016.01)
  *H01M 8/0273* (2016.01)
  *H01M 8/0286* (2016.01)
  *H01M 8/1018* (2016.01)
(52) U.S. Cl.
  CPC ........ *H01M 8/0273* (2013.01); *H01M 8/0286* (2013.01); *H01M 2008/1095* (2013.01)

(56) References Cited

FOREIGN PATENT DOCUMENTS

| | | | |
|---|---|---|---|
| JP | 2006-210060 A | | 8/2006 |
| JP | 2007-066766 A | | 3/2007 |
| JP | 2007-109576 A | | 4/2007 |
| JP | 2009-026528 A | | 2/2009 |
| JP | 2010-123491 A | | 6/2010 |
| JP | 2010123491 A | * | 6/2010 |
| JP | 2010-192392 A | | 9/2010 |
| JP | 2010192392 A | * | 9/2010 |
| WO | 2004/031465 A1 | | 4/2004 |

* cited by examiner

METHOD FOR PRODUCING ELECTROLYTE MEMBRANE ELECTRODE ASSEMBLY FOR FUEL CELLS

CROSS REFERENCE TO RELATED APPLICATIONS

The present application is a divisional application of U.S. Ser. No. 14/008,193, filed 27 Sep. 2013, which is the US National Phase Application of International Application PCT/JP2012/057507 filed on 23 Mar. 2012, which claims priority to Japanese patent applications Nos. 2011-082175, filed 1 Apr. 2011, and 2011-134851, filed on 17 Jun. 2011. The entire subject matter of these priority documents, including specification claims and drawings thereof, is incorporated by reference herein.

TECHNICAL FIELD

The present invention relates to a fuel cell membrane electrode assembly (electrolyte membrane-electrode assembly for fuel cells), and a method of producing the fuel cell membrane electrode assembly. The fuel cell membrane electrode assembly includes a solid polymer electrolyte membrane and a first electrode and a second electrode provided on both sides of the solid polymer electrolyte membrane. Each of the first electrode and the second electrode includes an electrode catalyst layer and a gas diffusion layer. The outer size of the first electrode is smaller than the outer size of the second electrode.

BACKGROUND ART

In general, a solid polymer electrolyte fuel cell employs a solid polymer electrolyte membrane. The solid polymer electrolyte membrane is a polymer ion exchange membrane. The fuel cell includes a membrane electrode assembly (MEA) where an anode and a cathode are provided on both sides of the solid polymer electrolyte membrane. Each of the anode and the cathode includes a catalyst layer (electrode catalyst layer) and a gas diffusion layer (porous carbon). In the fuel cell, the membrane electrode assembly is sandwiched between separators (bipolar plates). A predetermined number of the fuel cells are stacked together to form a fuel cell stack. For example, the fuel cell stack is mounted in a fuel cell electric vehicle as an in-vehicle fuel cell stack.

In certain cases, the membrane electrode assembly has structure where components of the MEA have different sizes, i.e., the surface size (surface area) of one of diffusion layers is smaller than the surface size (surface area) of the solid polymer electrolyte membrane, and the surface size of the other of the gas diffusion layers is the same as the surface size of the solid polymer electrolyte membrane (a stepped-type MEA).

Normally, in the fuel cell stack, a large number of membrane electrode assemblies are stacked together. In order to reduce the cost, there is a demand to produce the membrane electrode assembly at low cost. Therefore, in particular, for the purpose of reducing the amount of expensive material used for the solid polymer electrolyte membrane, and simplify the structure of the solid polymer electrolyte membrane, various proposals have been made.

For example, as shown in FIG. 19, a membrane electrode assembly disclosed in Japanese Laid-Open Patent Publication No. 2007-066766 (hereinafter referred to as conventional technique) includes an electrolyte membrane 1, a cathode catalyst layer 2a provided on one side of the electrolyte membrane 1, an anode catalyst layer 2b provided on the other surface of the electrolyte membrane 1, and gas diffusion layers 3a, 3b provided on both sides of the electrolyte membrane 1.

The surface area of the gas diffusion layer 3b of the anode is equal to the surface area of the electrolyte membrane 1, and larger than the surface area of the gas diffusion layer 3a of the cathode. A gasket structure body 4 is provided in an edge area of the membrane electrode assembly (MEA), and the outer end of the electrolyte membrane 1 adjacent to the gas diffusion layer 3a is joined to the gasket structure body 4 through an adhesive layer 5.

SUMMARY OF INVENTION

However, in the conventional technique, the MEA and the gasket structure body 4 are fixed to the outer marginal portion of the electrolyte membrane 1 exposed to the outside from the gas diffusion layer 3a, through the adhesive layer 5 only. Therefore, the strength of joining the MEA and the gasket structure body 4 is low, and the desired strength cannot be obtained.

The present invention has been made to solve the problem of this type, and an object of the present invention is to provide a fuel cell membrane electrode assembly and a method of producing the fuel cell membrane electrode assembly in which it is possible to firmly and easily join a resin frame member around a solid polymer electrolyte membrane, and suitably suppress deformation of the resin frame member.

The present invention relates to a fuel cell membrane electrode assembly, and a method of producing the fuel cell membrane electrode assembly. The fuel cell membrane electrode assembly includes a solid polymer electrolyte membrane and a first electrode and a second electrode provided on both sides of the solid polymer electrolyte membrane. Each of the first electrode and the second electrode includes an electrode catalyst layer and a gas diffusion layer. An outer size of the first electrode is smaller than an outer size of the second electrode.

The membrane electrode assembly includes a resin frame member provided around the solid polymer electrolyte membrane and an impregnation portion for joining the resin frame member and at least one of an outer marginal portion of the first electrode and an outer marginal portion of the second electrode together.

Further, the production method includes the steps of forming the first electrode and the second electrode on both sides of the solid polymer electrolyte membrane, forming a resin frame member, and overlapping an outer marginal portion of the first electrode and an inner marginal portion of the resin frame member with each other and heating the overlapped portions of the first electrode and the resin frame member to impregnate only the outer marginal portion of the first electrode with the inner marginal portion of the resin frame member and join the resin frame member around the solid polymer electrolyte membrane.

Further, the production method includes the steps of overlapping an outer marginal portion of the gas diffusion layer of the first electrode and an inner marginal portion of the resin frame member with each other and heating the overlapped portions of the first electrode and the resin frame member to impregnate only the outer marginal portion of the first electrode with the inner marginal portion of the resin frame member and join the resin frame member to the first electrode, forming the electrode catalyst layers on both surfaces of the solid polymer electrolyte membrane, and combining the gas diffusion layer of the first electrode joined to the resin frame member and the gas diffusion layer of the second electrode on both sides of the solid polymer electrolyte membrane into one piece.

Further, the production method includes the steps of overlapping an outer marginal portion of the gas diffusion layer of the first electrode and an inner marginal portion of the resin frame member with each other and heating the overlapped portions of the first electrode and the resin frame member to impregnate only the outer marginal portion of the first electrode with the inner marginal portion of the resin frame member and join the resin frame member to the first electrode, forming the electrode catalyst layer on the gas diffusion layer of the second electrode and forming the electrode catalyst layer of the first electrode on one side of the solid polymer electrolyte membrane, and combining the first electrode joined to the resin frame member and the second electrode on both sides of the solid polymer electrolyte membrane into one piece.

In the present invention, the impregnation portion joining the resin frame member and the at least one of the outer marginal portion of the first electrode and the outer marginal portion of the second electrode together is provided. In the structure, in comparison with the case where the resin frame member is joined to the first electrode or the second electrode by adhesion, the joining strength for joining the resin frame member to at least one of the first electrode and the second electrode is improved suitably, and it is possible to suppress occurrence of peeling or the like as much as possible.

In the production method of the present invention, the resin frame member is joined only to the first electrode. Therefore, the portion of the resin frame member where heat contraction occurs is reduced, and it becomes possible to suppress occurrence of warpage or the like of the resin frame member. Thus, it is possible to firmly and easily join the resin frame member around the solid polymer electrolyte membrane, and suitably suppress deformation of the resin frame member.

Further, in the present invention, the outer ends of the gas diffusion layers of the first electrode and the second electrode and the resin frame member are impregnated with resin to form the resin impregnation portion integrally. In the structure, in comparison with the case where the resin frame member is joined to the first electrode and the second electrode by adhesion, the joining strength for joining the resin frame member to the first electrode and the second electrode is improved suitably, and it is possible to suppress occurrence of peeling or the like as much as possible.

Further, in the present invention, the outer end of the gas diffusion of the second electrode and the resin frame member are impregnated with resin to form the resin impregnation portion integrally. Therefore, the portion of the resin frame member where heat contraction occurs is reduced, and it becomes possible to suppress occurrence of warpage or the like of the resin frame member. Further, since the resin impregnation portion is provided only at the second electrode having the large size, as the resin member, resin mixed with a glass filler is adopted, and it becomes possible to use resin having high melting temperature.

DESCRIPTIONS OF EMBODIMENTS

Figure 1:
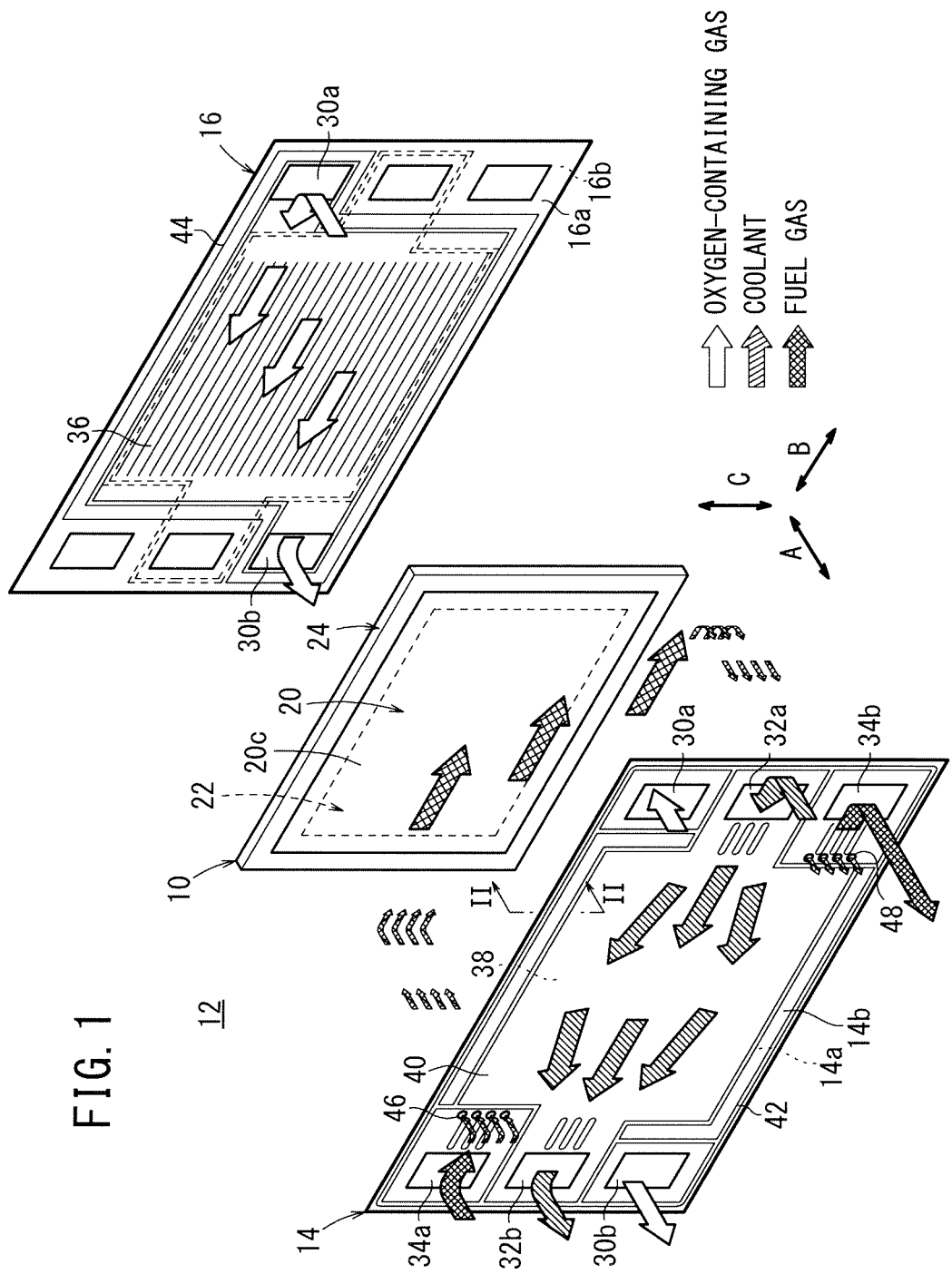
FIG. 1 is an exploded perspective view showing main components of a solid polymer electrolyte fuel cell including a membrane electrode assembly according to a first embodiment of the present invention.
Figure 2:
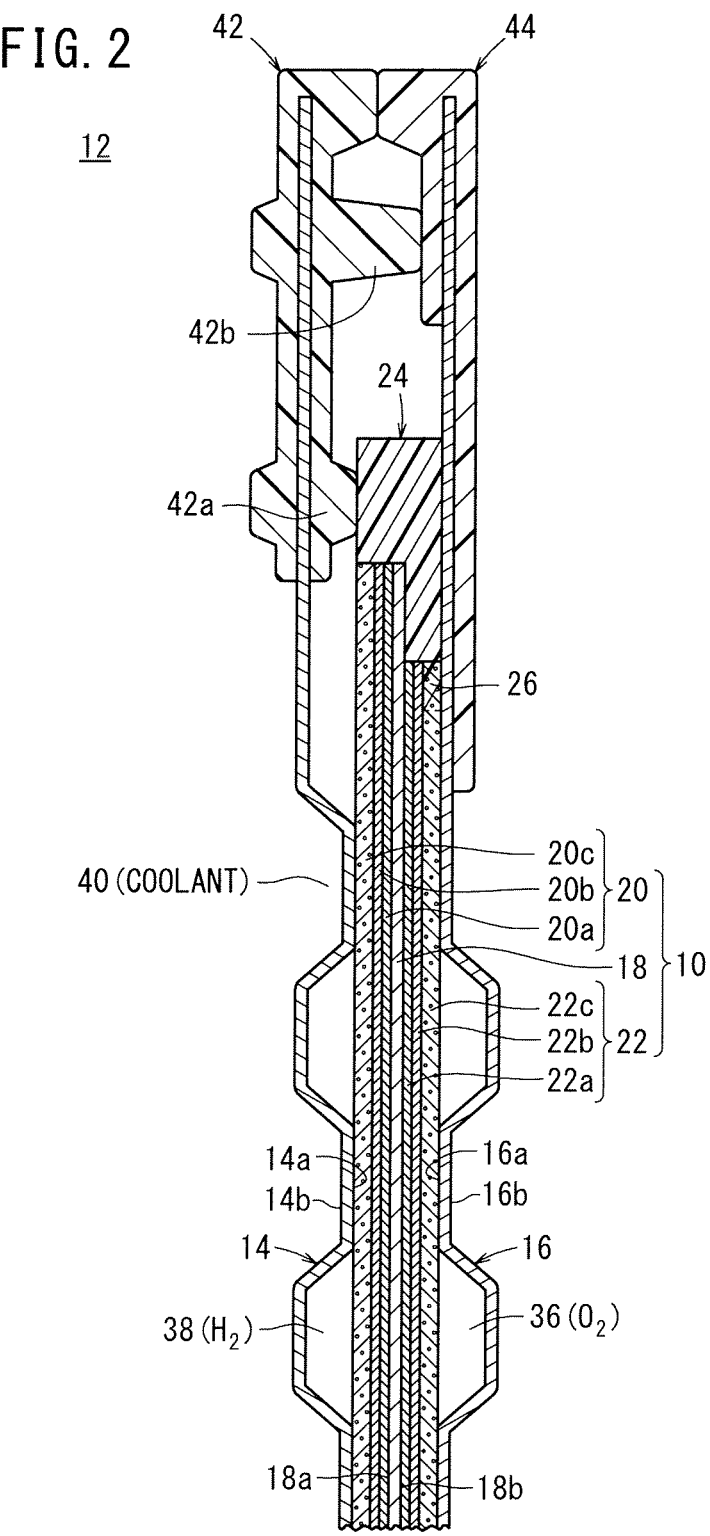
FIG. 2 is a cross sectional view showing the fuel cell, taken along a line II-II in FIG. 1.

As shown in FIGS. 1 and 2, a solid polymer electrolyte fuel cell 12 including a membrane electrode assembly 10 according to a first embodiment of the present invention is formed by sandwiching the membrane electrode assembly between a first separator 14 and a second separator 16. For example, the first separator 14 and the second separator 16 are made of metal plates such as steel plates, stainless steel plates, aluminum plates, plated steel sheets, or metal plates having anti-corrosive surfaces by surface treatment. Alternatively, carbon members may be used as the first separator 14 and the second separator 16.

As shown in FIG. 2, the membrane electrode assembly 10 includes a solid polymer electrolyte membrane 18, and an anode (second electrode) 20 and a cathode (first electrode) 22 sandwiching the solid polymer electrolyte membrane 18. The solid polymer electrolyte membrane 18 is formed by impregnating a thin membrane of perfluorosulfonic acid with water, for example. A fluorine based electrolyte may be used as the solid polymer electrolyte membrane 18. Alternatively, an HC (hydrocarbon) based electrolyte may be used as the solid polymer electrolyte membrane 18.

The surface size (surface area) of the cathode 22 is smaller than the surface sizes (surface areas) of the solid polymer electrolyte membrane 18 and the anode 20. It should be noted that the surface size of the cathode 22 may be equal to or larger than the surface size of the anode 20.

The anode 20 is provided on one surface 18a of the solid polymer electrolyte membrane 18 and the cathode 22 is provided on the other surface 18b of the solid polymer electrolyte membrane 18 such that a frame shaped outer portion of the solid polymer electrolyte membrane 18 is exposed.

The anode 20 includes an electrode catalyst layer 20a joined to the surface 18a of the solid polymer electrolyte membrane 18 and a gas diffusion layer 20c stacked on the electrode catalyst layer 20a through an intermediate layer (underlying layer) 20b. The cathode 22 includes an electrode catalyst layer 22a joined to the surface 18b of the solid polymer electrolyte membrane 18 and a gas diffusion layer 22c stacked on the electrode catalyst layer 22a through an intermediate layer (underlying layer) 22b.

Each of the electrode catalyst layers 20a, 22a is formed by carbon black supporting platinum particles as catalyst particles. As an ion conductive binder, polymer electrolyte is used. Catalyst paste formed by mixing the catalyst particles uniformly in the solution of this polymer electrolyte is printed, applied (coated) or transferred on both surfaces 18a, 18b of the solid polymer electrolyte membrane 18 to form the electrode catalyst layers 20a, 22a.

Carbon black and FEP (fluorinated ethylene-propylene copolymer) particles and carbon nanotube are prepared in a form of paste, and coated on the gas diffusion layer 20c, 22c to form the intermediate layers 20b, 22b. The gas diffusion layers 20c, 22c are made of carbon papers or the like, and the surface size of the gas diffusion layer 20c is larger that the surface size of the gas diffusion layer 22c.

Figure 3:
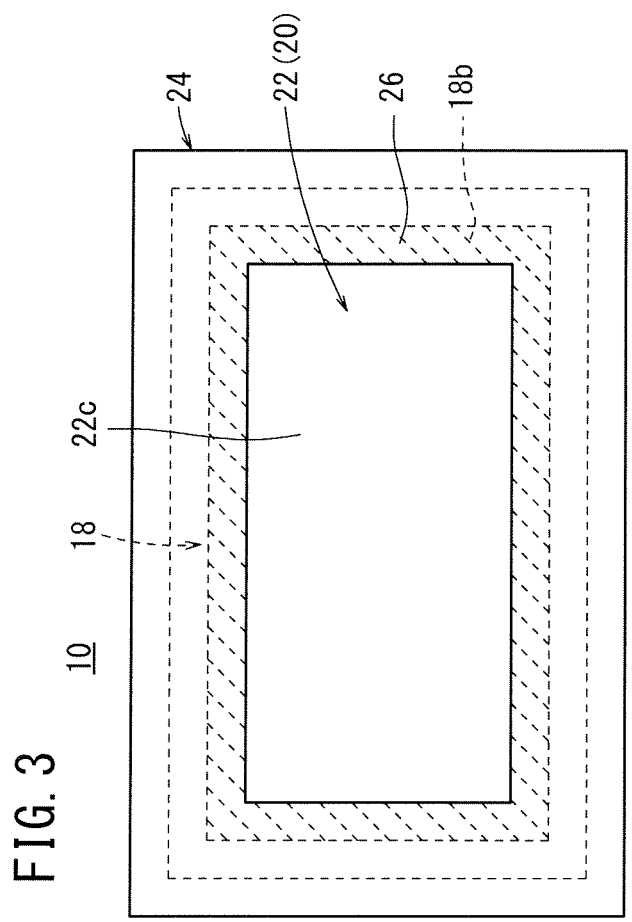
FIG. 3 is a front view showing a cathode of the membrane electrode assembly.

As shown in FIGS. 2 and 3, the membrane electrode assembly 10 includes a resin frame member 24 formed around the solid polymer electrolyte membrane 18, and joined only to the cathode 22 of the solid polymer electrolyte membrane 18. For example, the resin frame member 24 is made of PPS (poly phenylene sulfide), PPA (polyphthalamide), etc., and includes an impregnation portion 26 for impregnation of only the outer marginal portion of the cathode 22 with the inner marginal portion of the resin frame member 24.

As shown in FIG. 1, at one end of the fuel cell 12 in a direction indicated by an arrow B (horizontal direction in FIG. 1), an oxygen-containing gas supply passage 30a for supplying an oxygen-containing gas, a coolant supply passage 32a for supplying a coolant, and a fuel gas discharge passage 34b for discharging a fuel gas such as a hydrogen containing gas are arranged in a vertical direction indicated by an arrow C. The oxygen-containing gas supply passage 30a, the coolant supply passage 32a, and the fuel gas discharge passage 34b extend through the fuel cell 12 in a stacking direction indicated by an arrow A.

At the other end of the fuel cell 12 in the direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are arranged in the direction indicated by an arrow C. The fuel gas supply passage 34a, the coolant discharge passage 32b, and the oxygen-containing gas discharge passage 30b extend through the fuel cell 12 in the direction indicated by the arrow A.

The second separator 16 has an oxygen-containing gas flow field 36 on its surface 16a facing the membrane electrode assembly 10. The oxygen-containing gas flow field 36 is connected to the oxygen-containing gas supply passage 30a and the oxygen-containing gas discharge passage 30b.

The first separator 14 has a fuel gas flow field 38 on its surface 14a facing the membrane electrode assembly 10. The fuel gas flow field 38 is connected to the fuel gas supply passage 34a and the fuel gas discharge passage 34b. A coolant flow field 40 is formed between a surface 14b of the first separator 14 and a surface 16b of the second separator 16. The coolant flow field 40 is connected to the coolant supply passage 32a and the coolant discharge passage 32b.

As shown in FIGS. 1 and 2, a first seal member 42 is formed integrally with the surfaces 14a, 14b of the first separator 14, around the outer end of the first separator 14. A second seal member 44 is formed integrally with the surfaces 16a, 16b of the second separator 16, around the outer end of the second separator 16.

As shown in FIG. 2, the first seal member 42 includes a first ridge seal 42a which contacts the resin frame member 24 of the membrane electrode assembly 10, and a second ridge seal 42b interposed between the first separator 14 and the second separator 16. The second seal member 44 is a flat surface seal. Instead of providing the second ridge seal 42b, the second seal member 44 may have a ridge seal (not shown).

Each of the first seal member 42 and the second seal members 44 is made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 1, the first separator 14 has supply holes 46 connecting the fuel gas supply passage 34a to the fuel gas flow field 38, and discharge holes 48 connecting the fuel gas flow field 38 to the fuel gas discharge passage 34b.

In this fuel cell 12, a method of producing the membrane electrode assembly 10 according to a first embodiment of the present invention will be described below.

Figure 4:
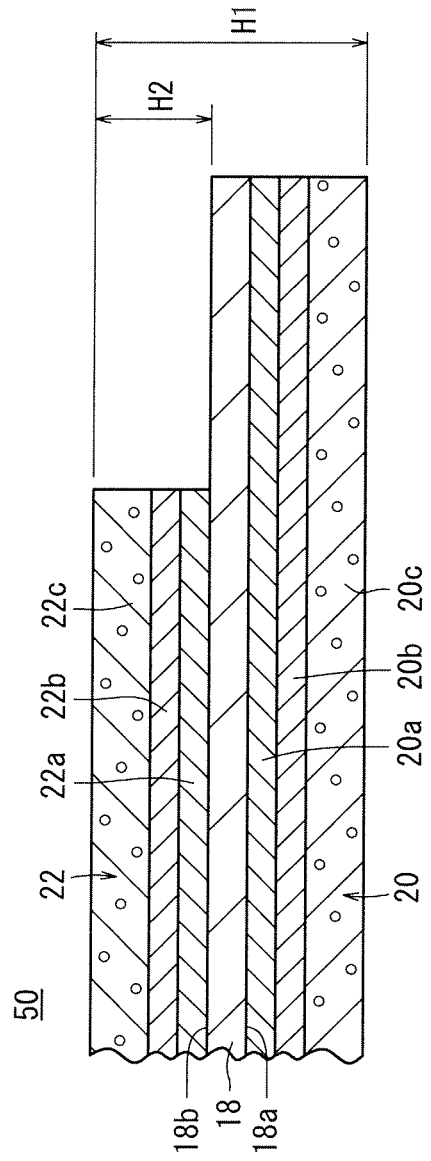
FIG. 4 is a partial cross sectional view showing an MEA having different sizes of components in a production method according to the first embodiment of the present invention.

Firstly, as shown in FIG. 4, an MEA 50 having different sizes of components is produced. Specifically, the electrode catalyst layers 20a, 22a are coated on both surfaces 18a, 18b of the solid polymer electrolyte membrane 18, and the intermediate layers 20b, 22b each comprising a mixture of water-repellent agent and carbon particles are coated on the gas diffusion layers 20c, 22c.

Then, the gas diffusion layer 20c is placed on a side adjacent to the surface 18a of the solid polymer electrolyte membrane 18, i.e., the gas diffusion layer 20c is placed such that the intermediate layer 20b faces the electrode catalyst layer 20a. Further, the gas diffusion layer 22c is placed on a side adjacent to the surface 18b of the solid polymer electrolyte membrane 18, i.e., the gas diffusion layer 22c is placed such that the intermediate layer 22b faces the electrode catalyst layer 22a. These components are stacked together, and subjected to hot pressing treatment to produce the MEA 50.

Figure 5:
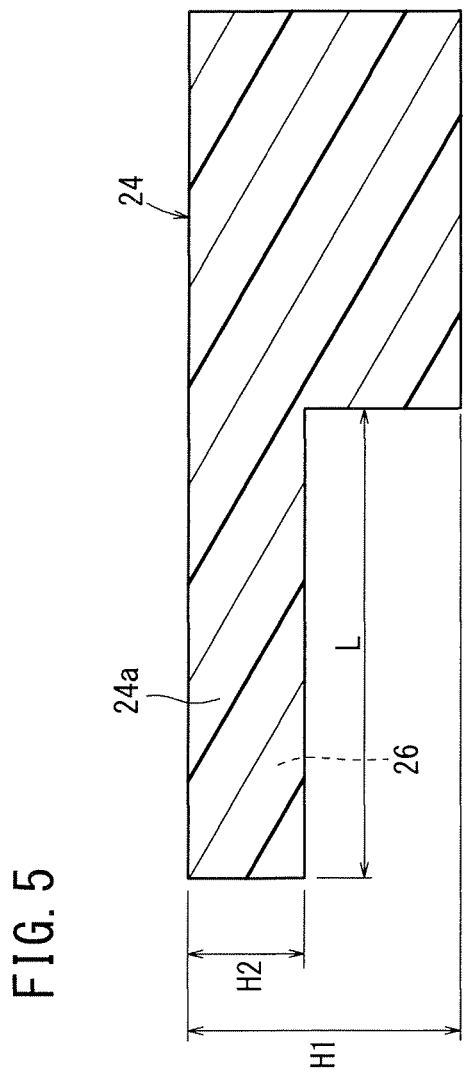
FIG. 5 is a view showing a resin frame member.

As shown in FIG. 5, the resin frame member 24 is formed by an injection molding machine (not shown) beforehand. The dimension (width) H1 of the resin frame member 24 and the dimension (thickness) H1 of the MEA 50 are the same. The resin frame member 24 has an inner extension 24a at its inner marginal portion. The thickness H2 of the inner extension 24a and the thickness H2 of the cathode 22 of the MEA 50 are the same. The extension length L of the inner extension 24a is the sum of the distance from the front end of the solid polymer electrolyte membrane 18 of the MEA 50 to the front end of the cathode 22 and the length of the impregnation portion 26.

Figure 6:
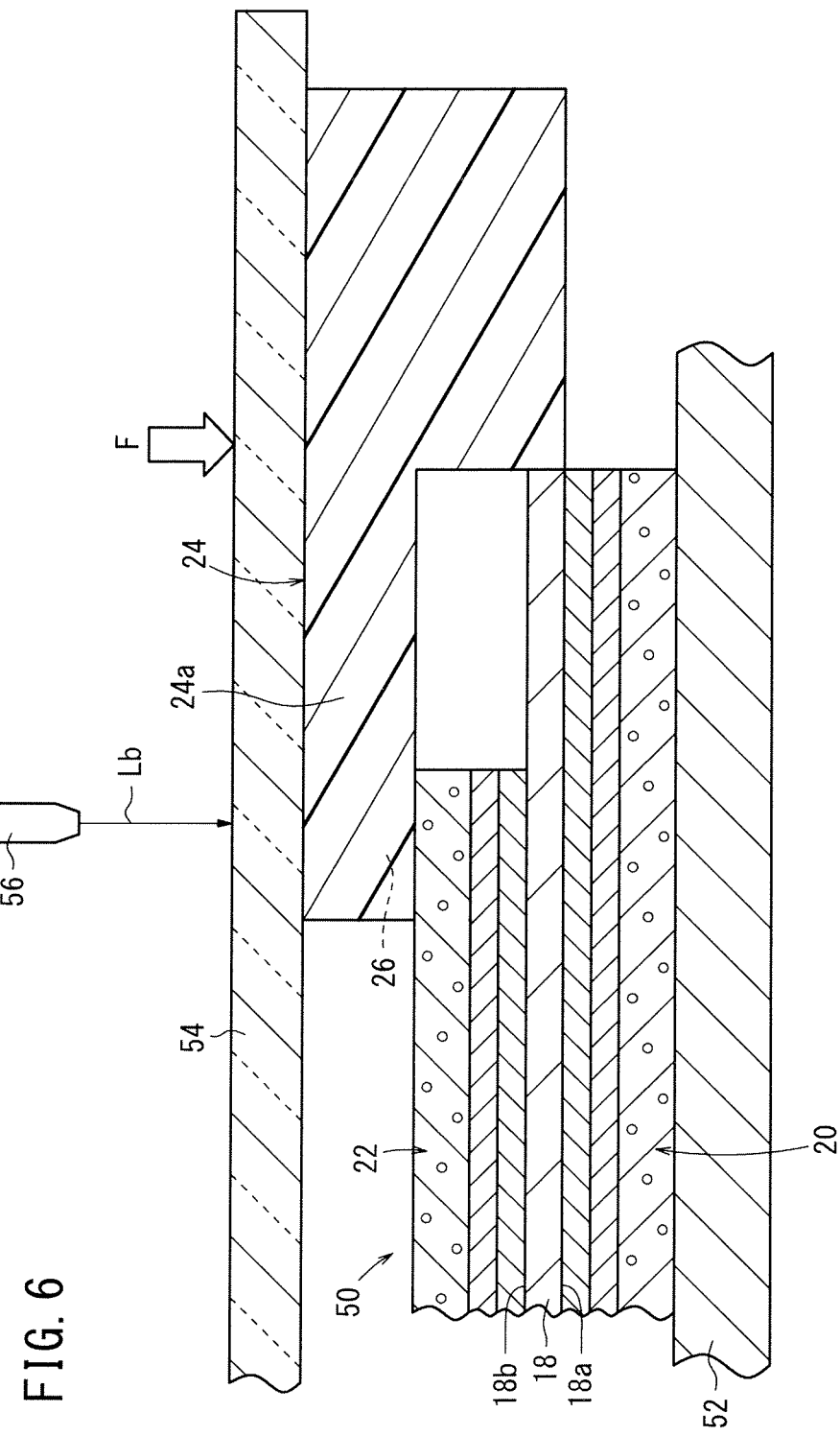
FIG. 6 is a view showing a process of joining the MEA and the resin frame member.

Next, as shown in FIG. 6, the MEA 50 is placed on a base table 52 such that the anode 20 is positioned on the lower side. The front end of the inner extension 24a of the resin frame member 24 is overlapped with the outer marginal portion of the cathode 22 of the MEA 50. A glass plate 54 is placed on the resin frame member 24. A load F is applied to the resin frame member 24 through the glass plate 54, toward the base table 52, and a laser beam Lb is radiated from a laser machine 56 through the glass plate 54 to the overlapped portions (an area where the outer marginal portion of the cathode 22 and the inner marginal portion of the resin frame member 24 are overlapped with each other).

Thus, the inner extension 24a of the resin frame member 24 as the inner marginal portion is locally heated in a concentrated manner, and melted. The gas diffusion layer 22c of the cathode 22 is impregnated with the melted resin of the inner extension 24a of the resin frame member 24. Therefore, as shown in FIG. 2, the resin frame member 24 is joined to the cathode 22 by the impregnation portion 26 where only the outer marginal portion of the cathode 22 is impregnated with the melted resin of the inner marginal portion of the resin frame member 24. In this manner, the membrane electrode assembly 10 is produced.

In the first embodiment, after the MEA 50 and the resin frame member 24 are produced separately, only the outer marginal portion of the cathode 22 is impregnated with the melted resin of the inner marginal portion of the resin frame member 24 to join the resin frame member 24 to the cathode 22. Thus, in comparison with the case where the resin frame member 24 is joined to the cathode 22 by adhesion, the joining strength for joining the resin frame member 24 to the cathode 22 is improved suitably, and it is possible to suppress occurrence of peeling or the like as much as possible.

Further, since the resin frame member 24 is joined only to the cathode 22, the portion of the resin frame member 24 where heat contraction occurs is reduced, and it becomes possible to suppress occurrence of warpage or the like of the resin frame member 24.

In particular, the heating treatment is applied only to the overlapped portions in a concentrated manner by laser heating using the laser machine 56. Therefore, since the resin frame member 24 is heated only locally, the time required for melting is reduced. Accordingly, cost reduction is achieved, and deformation is reduced as much as possible. It should be noted that infrared welding, impulse welding or the like may be adopted instead of laser welding using the laser machine 56.

Operation of the fuel cell 12 will be described.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, coolant such as pure water, ethylene glycol, or oil is supplied to the coolant supply passage 32a.

Thus, the oxygen-containing gas flows from the oxygen-containing gas supply passage 30a to the oxygen-containing gas flow field 36 of the second separator 16. The oxygen-containing gas moves in the direction indicated by the arrow B, and the oxygen-containing gas is supplied to the cathode 22 of the membrane electrode assembly 10. In the meanwhile, the fuel gas flows from the fuel gas supply passage 34a through the supply holes 46 into the fuel gas flow field 38 of the first separator 14. The fuel gas flows along the fuel gas flow field 38 in the direction indicated by the arrow B, and the fuel gas is supplied to the anode 20 of the membrane electrode assembly 10.

Thus, in each of the membrane electrode assemblies 10, the oxygen-containing gas supplied to the cathode 22 and the fuel gas supplied to the anode 20 are partially consumed in the electrochemical reactions in the electrode catalyst layers for generating electricity.

Then, the oxygen-containing gas partially consumed at the cathode 22 flows along the oxygen-containing gas discharge passage 30b, and the oxygen-containing gas is discharged in the direction indicated by the arrow A. Likewise, the fuel gas partially consumed at the anode 20 flows through the discharge holes 48. Then, the fuel gas flow along the fuel gas discharge passage 34b, and the fuel gas is discharged in the direction indicated by the arrow A.

Further, the coolant supplied to the coolant supply passage 32a flows into the coolant flow field 40 between the first separator 14 and the second separator 16. Then, the coolant flows in the direction indicated by the arrow B. After the coolant cools the membrane electrode assembly 10, the coolant is discharged into the coolant discharge passage 32b.

Figure 7:
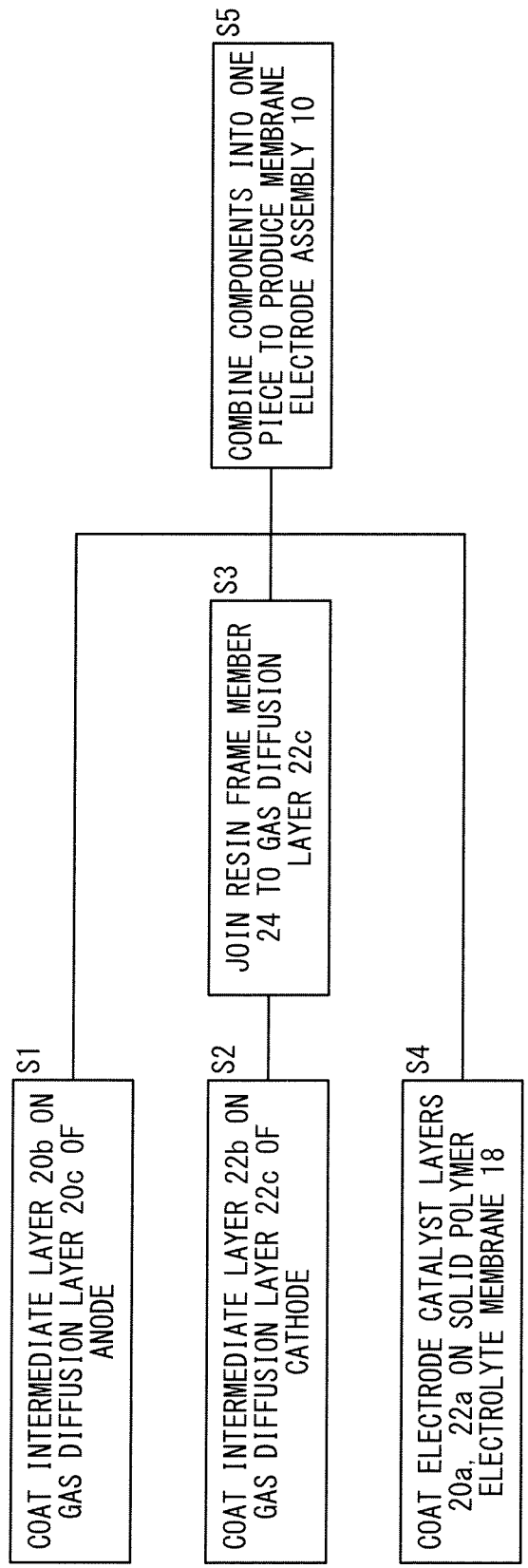
FIG. 7 is a diagram showing steps of a production method according to a second embodiment of the present invention.

FIG. 7 is a diagram showing steps of a method of producing the membrane electrode assembly 10 according to a second embodiment of the present invention.

In the second embodiment, the intermediate layer 20b is coated on the gas diffusion layer of the anode (S1), and the intermediate layer 22b is coated on the gas diffusion layer 22c of the cathode (S2). The resin frame member 24 formed by injection molding beforehand is joined to the gas diffusion layer 22c (S3). The process of joining the gas diffusion layer 22c of the cathode 22 to the resin frame member 24 is substantially the same as in the case of the first embodiment. For example, the gas diffusion layer 22c and the resin frame member 24 are joined together by placing the gas diffusion layer 22c on the base table 52 shown in FIG. 6. In this manner, the resin frame member 24 and the gas diffusion layer 22c of the cathode 22 are combined into one piece by the impregnation portion 26.

The electrode catalyst layers 20a, 22a are coated on both surfaces 18a, 18b of the solid polymer electrolyte membrane 18 (S4). Further, the gas diffusion layer 20c of the anode and the gas diffusion layer 22c joined to the resin frame member 24 are placed on both surfaces 18a, 18b of the solid polymer electrolyte membrane 18, respectively. These components are subjected to hot pressing treatment to produce the membrane electrode assembly 10 (S5).

Accordingly, in the second embodiment, the same advantages as in the case of the first embodiment are obtained.

Figure 8:
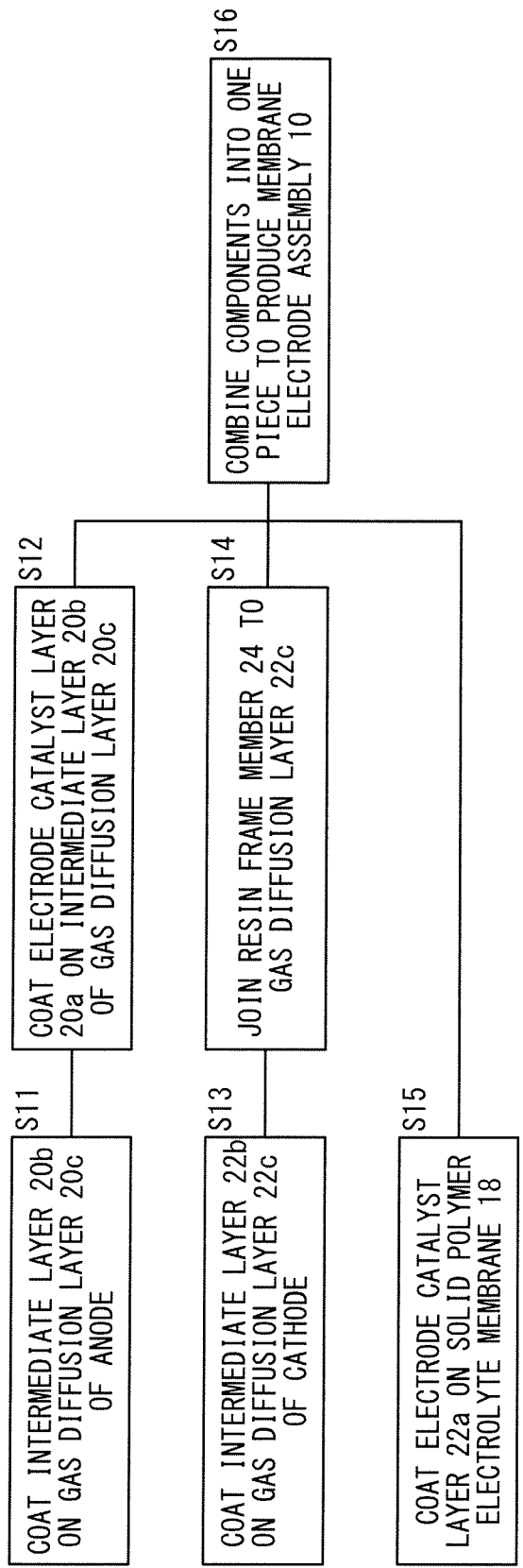
FIG. 8 is a diagram showing steps of a production method according to a third embodiment of the present invention.

FIG. 8 is a diagram showing steps of a method of producing a membrane electrode assembly 10 according to a third embodiment of the present invention.

In the third embodiment, after the intermediate layer 20b is coated on the gas diffusion layer 20c of the anode (S11), the electrode catalyst layer 20a is coated on the intermediate layer 20b of the gas diffusion layer 20c (S12). Further, after the intermediate layer 22b is coated on the gas diffusion layer 22c of the cathode (S13), the resin frame member 24 is joined to the gas diffusion layer 22c (S14). The process of joining the gas diffusion layer 22c to the resin frame member 24 is the same as in the cases of the first and second embodiments.

Further, the electrode catalyst layer 22a of the cathode is coated on the surface 18b of the solid polymer electrolyte membrane 18 (S15). Then, the gas diffusion layer 20c of the anode and the gas diffusion layer 22c of the cathode joined to the resin frame member 24 are placed on both surfaces 18a, 18b of the solid polymer electrolyte membrane 18, respectively. These components are subjected to hot pressing treatment to produce the membrane electrode assembly 10 (S16).

Accordingly, in the third embodiment, the same advantages as in the cases of the first and second embodiments are obtained.

Figure 9:
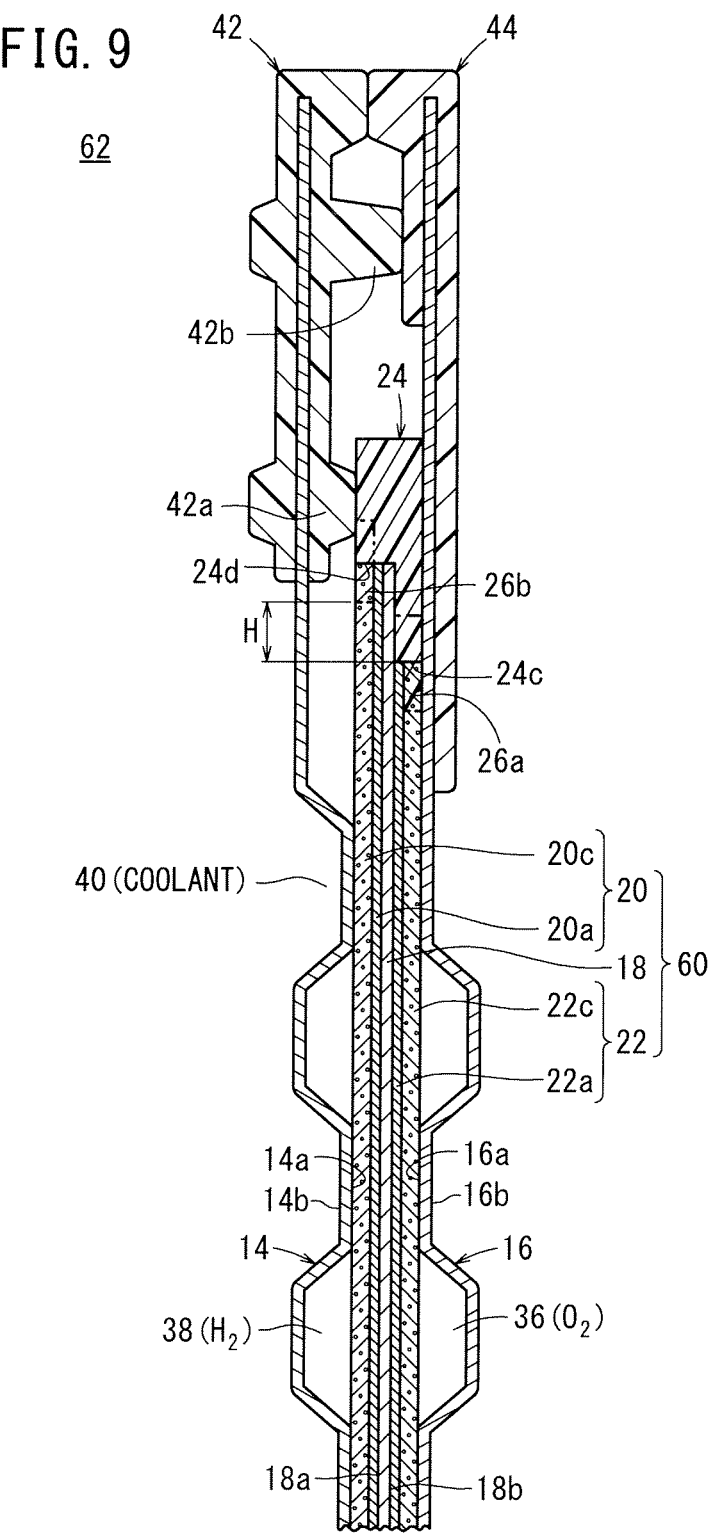
FIG. 9 is a cross sectional view showing a solid polymer electrolyte fuel cell including a membrane electrode assembly according to a fourth embodiment of the present invention.

FIG. 9 is a cross sectional view showing a solid polymer electrolyte fuel cell 62 including a membrane electrode assembly 60 according to a fourth embodiment of the present invention. The constituent elements of the solid polymer electrolyte fuel cell 62 that are identical to those of the solid polymer electrolyte fuel cell 12 including the membrane electrode assembly 10 according to the first embodiment are labeled with the same reference numerals, and descriptions thereof will be omitted. Likewise, also in fifth and subsequent embodiments described later, the constituent elements that are identical to those of the solid polymer electrolyte fuel cell 12 including the membrane electrode assembly 10 according to the first embodiment are labeled with the same reference numerals, and descriptions thereof will be omitted.

In the membrane electrode assembly 60, the anode 20 includes an electrode catalyst layer 20a joined to the surface 18a of the solid polymer electrolyte membrane 18 and a gas diffusion layer 20c stacked on the electrode catalyst layer 20a. The cathode 22 includes an electrode catalyst layer 22a joined to the surface 18b of the solid polymer electrolyte membrane 18 and a gas diffusion layer 22c stacked on the electrode catalyst layer 22a. Though not shown, the electrode catalyst layer 20a and the gas diffusion layer 20c may be provided through an intermediate layer (underlying layer). Likewise, the electrode catalyst layer 22a and the gas diffusion layer 22c may be provided through an intermediate layer (underlying layer).

The resin frame member 24 and the gas diffusion layer 22c of the cathode 22 are combined into one piece by a first resin impregnation portion 26a, and the resin frame member 24 and the gas diffusion layer 20c of the anode 20 are combined into one piece by a second resin impregnation portion 26b.

Figure 10:
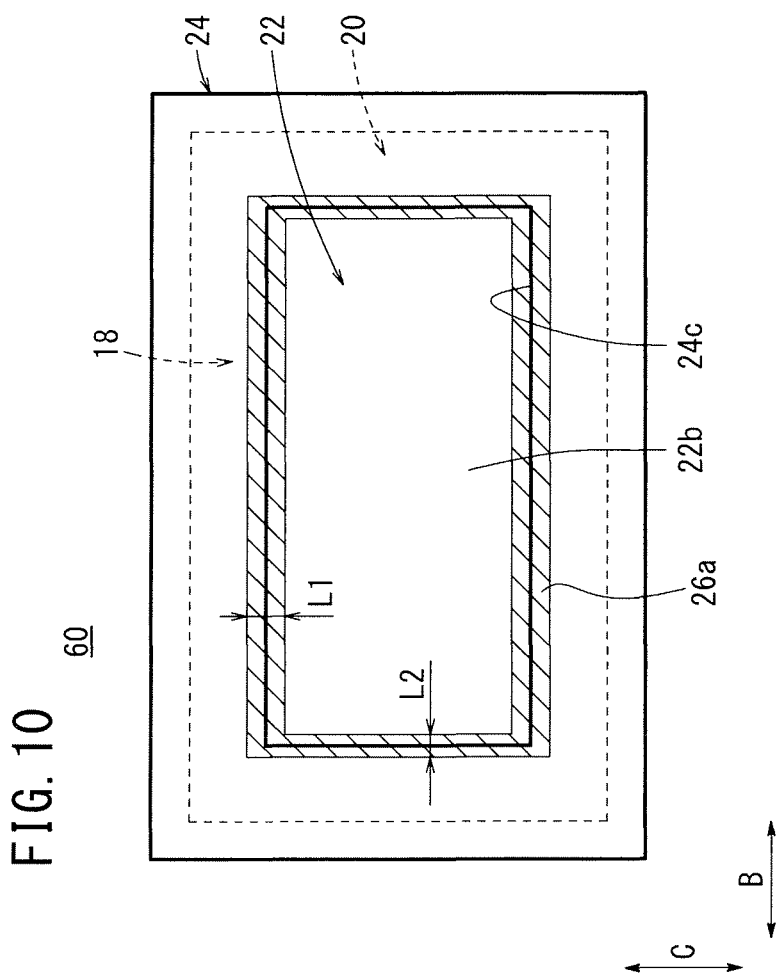
FIG. 10 is a front view showing a cathode of the membrane electrode assembly.

As shown in FIG. 10, the first resin impregnation portion 26a is formed over the entire circumference of the gas diffusion layer 22c of the cathode 22. The width L1 on the long side of the first resin impregnation portion 26a (side extending in the direction indicated by the arrow B) is larger than the width L2 on the short side of the first resin impregnation portion 26a (side extending in the direction indicated by the arrow C) (L1>L2).

Figure 11:
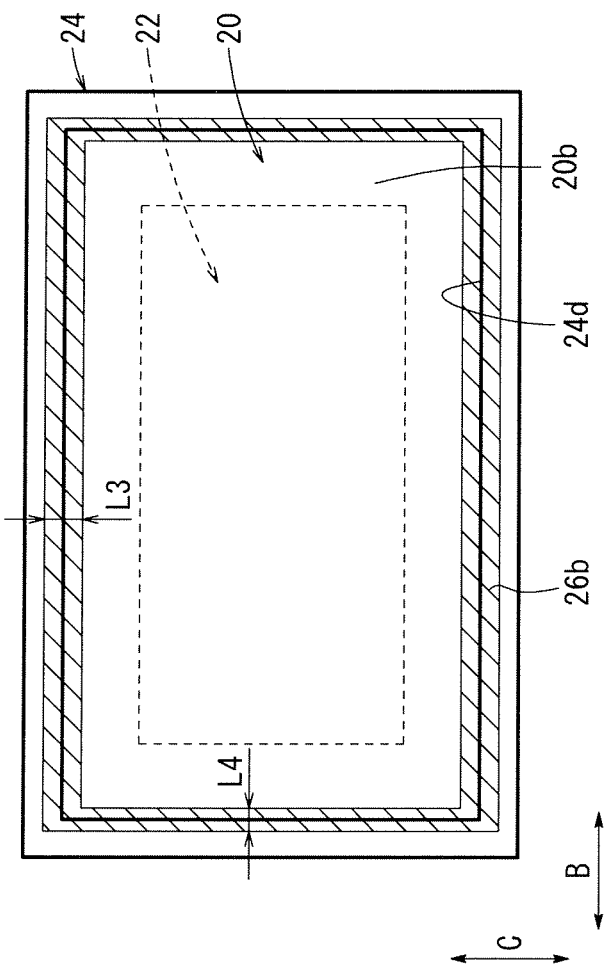
FIG. 11 is a front view showing an anode of the membrane electrode assembly.

As shown in FIG. 11, the second resin impregnation portion 26b is formed over the entire circumference of the gas diffusion layer 20c of the anode 20. The width L3 on the long side of the second resin impregnation portion 26b (side extending in the direction indicated by the arrow B) is larger than the width L4 on the short side of the second resin impregnation portion 26b (side extending in the direction indicated by the arrow C) (L3>L4).

As shown in FIG. 9, the second resin impregnation portion 26b is terminated at a position spaced outward of a first inner circumferential portion 24c of the resin frame member 24 adjacent to the cathode 22 by the distance H.

That is, the second resin impregnation portion 26b is not provided at a position overlapped with the cathode 22 in the stacking direction.

Next, a method of producing the membrane electrode assembly 60 will be described below.

Figure 12:
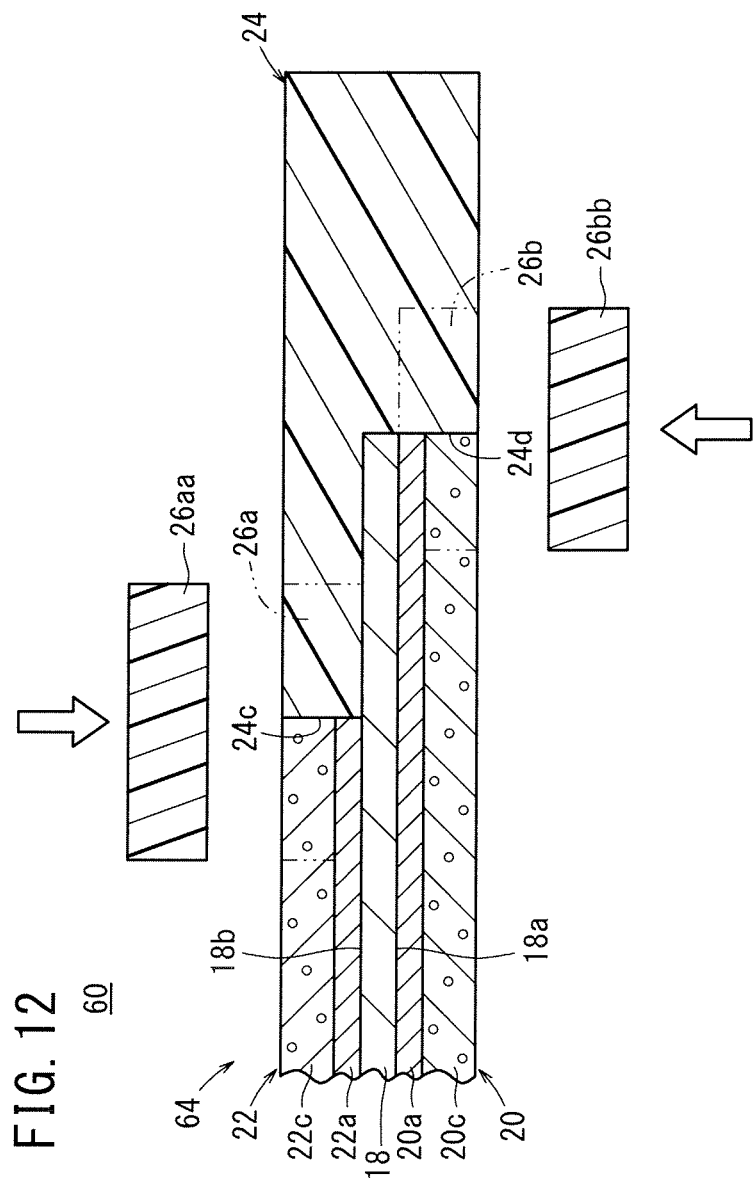
FIG. 12 is a view showing a method of producing the membrane electrode assembly.

Firstly, as shown in FIG. 12, an MEA 64 having different sizes of components (stepped-type MEA) of the membrane electrode assembly 60 is produced. Specifically, the electrode catalyst layers 20a, 22a are coated on both surfaces 18a, 18b of the solid polymer electrolyte membrane 18. The gas diffusion layer 20c is placed adjacent to the surface 18a of the solid polymer electrolyte membrane 18, i.e., on the electrode catalyst layer 20a, and the gas diffusion layer 22c is placed adjacent to the surface 18b of the solid polymer electrolyte membrane 18, i.e., on the electrode catalyst layer 22a. These components are stacked together, and subjected to hot pressing treatment to produce the MEA 64.

In the meanwhile, the resin frame member 24 is formed beforehand by an injection molding machine (not shown). The resin frame member 24 is positioned in alignment with the MEA 64. The resin frame member 24 has the first inner circumferential portion 24c and a second inner circumferential portion 24d. The end of the cathode 22 is positioned at the first inner circumferential portion 24c, and the end of the anode 20 is positioned at the second inner circumferential portion 24d.

A first resin member 26aa forming the first resin impregnation portion 26a is prepared at the cathode 22, and a second resin member 26bb forming the second resin impregnation portion 26b is prepared at the anode 20. Each of the first resin member 26aa and the second resin member 26bb has a frame shape, and is made of the same material as the resin frame member 24, for example.

The resin frame member 24 uses resin material enforced by mixing a filler with the resin material. The first resin member 26aa and the second resin member 26bb may be made of resin material which is not mixed with any filler. In the structure, using the robust resin frame member 24, the MEA 64 and the resin frame member 24 can be joined together.

Then, in the state where the first resin member 26aa and the second resin member 26bb are placed over the MEA 64 and the resin frame member 24 and a load is applied to the MEA 64 and the resin frame member 24 through the first resin member 26aa and the second resin member 26bb, the first resin member 26aa and the second resin member 26bb are heated. As a heating method, any of laser welding, infrared welding, and impulse welding, etc. is adopted.

Thus, the first resin member 26aa and the second resin member 26bb are melted by heating. Both of the gas diffusion layer 22c of the cathode 22 and the resin frame member 24 are impregnated with the melted resin of the first resin member 26aa, and both of the gas diffusion layer 20c of the anode 20 and the resin frame member 24 are impregnated with the melted resin of the second resin member 26bb.

Thus, as shown in FIG. 9, the first resin impregnation portion 26a is formed over the gas diffusion layer 22c of the cathode 22 and the resin frame member 24, and the second resin impregnation portion 26b is formed over the gas diffusion layer 20c of the anode 20 and the resin frame member 24 to produce the membrane electrode assembly 60.

In the fourth embodiment, the outer ends of the gas diffusion layers 22c, 20c of the cathode 22 and the anode 20 and the resin frame member 24 are impregnated with resin, respectively, and formed integrally with the first resin impregnation portion 26a and the second resin impregnation portion 26b.

In the structure, in comparison with the case where the resin frame member 24 is joined to the cathode 22 and the anode 20 by adhesion, the joining strength for joining the resin frame member 24 to the cathode 22 and the anode 20 is improved suitably, and it is possible to suppress occurrence of peeling or the like as much as possible.

Further, the width L1 on the long side of the first resin impregnation portion 26a is larger than the width L2 on the short side of the first resin impregnation portion 26a (L1>L2) (see FIG. 10). Moreover, the width L3 on the long side of the second resin impregnation portion 26b is larger than the width L4 on the short side of the second resin impregnation portion 26b (L3>L4) (see FIG. 11). Thus, further improvement in the joining strength for joining the resin frame member 24 to the cathode 22 and the anode 20 is achieved suitably.

Further, as shown in FIG. 9, the second resin impregnation portion 26b is terminated at a position spaced outward of the first inner circumferential portion 24c of the resin frame member 24 adjacent to the cathode 22, by the distance H. In the range of the distance H, since the electrode catalyst layer 22a of the cathode 22 facing the anode 20 is not present, abnormal reaction does not occur.

Figure 13:
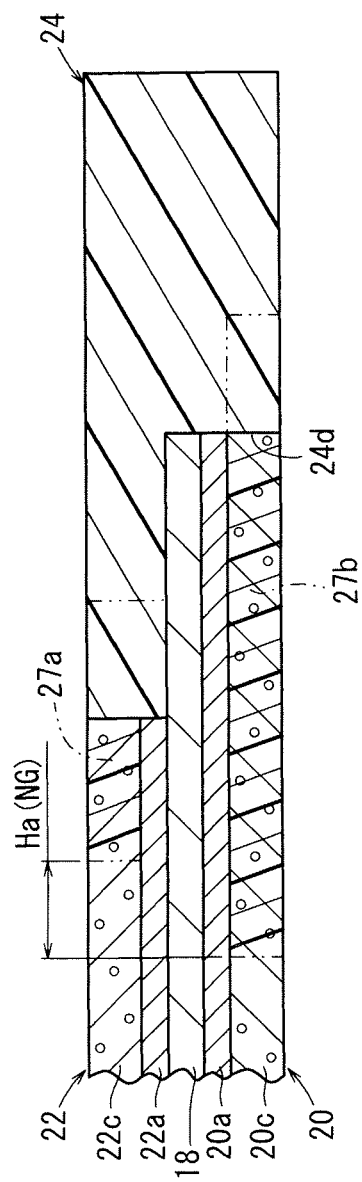
FIG. 13 is a view showing a comparative example of the membrane electrode assembly.

For example, in a comparative example shown in FIG. 13, the gas diffusion layer 22c of the cathode 22 and the resin frame member 24 are combined into one piece by a first resin impregnation portion 27a. Further, the gas diffusion layer 20c of the anode 20 and the resin frame member 24 are combined into one piece by a second resin impregnation portion 27b. The second resin impregnation portion 27b extends inward of the end of the first resin impregnation portion 27a by the distance Ha.

In the comparative example, the electrode catalyst layer 22a of the cathode 22 is present in the range of the distance Ha where the second resin impregnation portion 27b is provided. In the structure, shortage of hydrogen occurs at the anode 20 in the range of the distance Ha, and abnormal reaction tends to occur at the cathode 22.

Specifically, by reactions of $H_2O \rightarrow \frac{1}{2}O_2 + 2H^+ + 2e-$, $C + 2H_2O \rightarrow CO_2 + 4H^+ + 4e-$, and $Pt \rightarrow PT^{2+} + 2e-$, dissolution of corrosive Pt of the supporting carbon occurs, and consequently, the performance is lowered undesirably.

Figure 14:
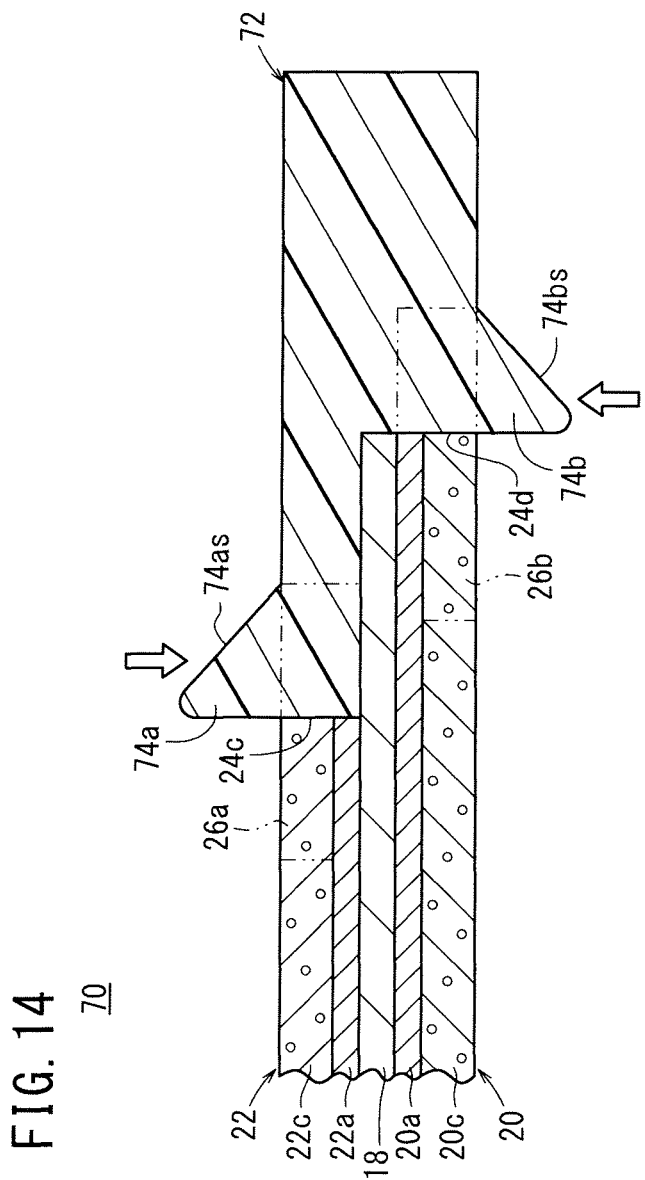
FIG. 14 is a cross sectional view showing main components of a membrane electrode assembly according to a fifth embodiment of the present invention.

FIG. 14 is a cross sectional view showing main components of a membrane electrode assembly 70 according to a fifth embodiment of the present invention.

The membrane electrode assembly 70 includes a resin frame member 72 joined to the cathode 22 and the anode 20. A first resin protrusion 74a and a second resin protrusion 74b are formed integrally with the resin frame member 72 for combining the resin frame member 72 and the gas diffusion layer 22c of the cathode 22 into one piece, and combining the resin frame member 72 and the gas diffusion layer 20c of the anode 20 into one piece.

The first resin protrusion 74a is formed in a frame shape around the first inner circumferential portion 24c, and the second resin protrusion 74b is formed in a frame shape around the second inner circumferential portion 24d. Preferably, the first resin protrusion 74a has an inclined surface 74as as an end surface opposite to the first inner circumferential portion 24c, and the inclined surface 74as is inclined in a direction spaced from the resin frame member 72.

Likewise, preferably, the second resin protrusion 74b has an inclined surface 74bs as an end surface opposite to the second inner circumferential portion 24d, and the inclined surface 74bs is inclined in a direction spaced from the resin frame member 72.

The first resin protrusion 74a and the second resin protrusion 74b are heated by a heating machine (not shown), and melted. By applying a load to the first resin protrusion 74a and the second resin protrusion 74b, the gas diffusion layers 22c, 20c are impregnated with the melted resin of the first resin protrusion 74a and the second resin protrusion 74b. In this manner, the first resin impregnation portion 26a and the second resin impregnation portion 26b are formed. Thus, in the fifth embodiment, the same advantages as in the case of the fourth embodiment are obtained.

Figure 15:
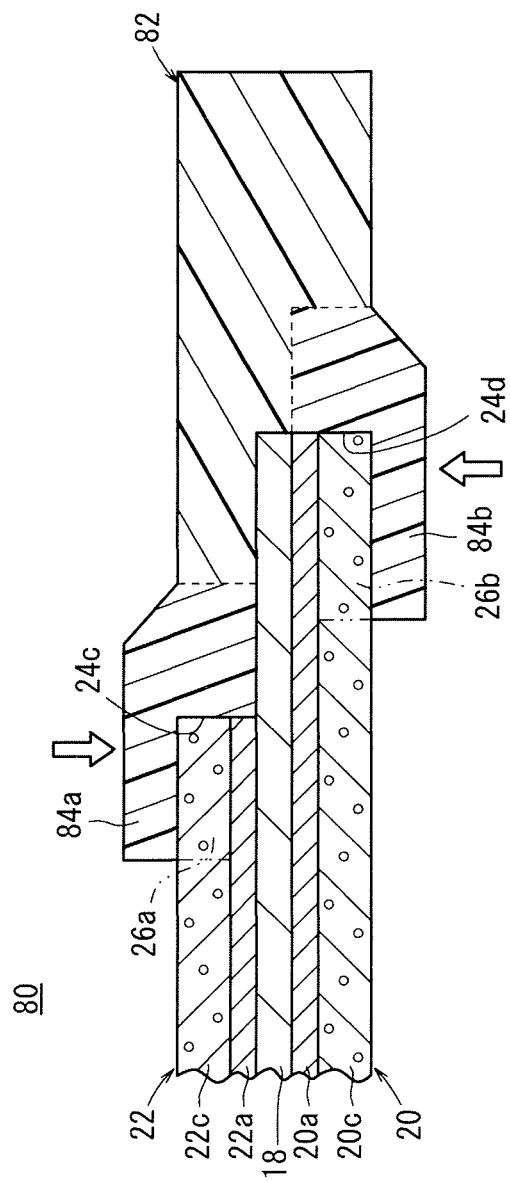
FIG. 15 is a cross sectional view showing main components of a membrane electrode assembly according to a sixth embodiment of the present invention.

FIG. 15 is a cross sectional view showing main components of a membrane electrode assembly 80 according to a sixth embodiment of the present invention.

The membrane electrode assembly 80 includes a resin frame member 82 joined to the cathode 22 and the anode 20. The resin frame member 82 includes a first resin member 84a and a second resin member 84b for combining the resin frame member 82 and the gas diffusion layer 22c of the cathode 22 into one piece, and combining the resin frame member 82 and the gas diffusion layer 20c of the anode 20 into one piece. The first resin member 84a and the second resin member 84b are formed integrally with the resin frame member 82 by insert molding beforehand.

The first resin member 84a and the second resin member 84b are heated by a heating machine (not shown), and melted. By applying a load to the first resin member 84a and the second resin member 84b, the gas diffusion layers 22c, 20c are impregnated with the melted resin of the first resin member 84a and the second resin member 84b. In this manner, the first resin impregnation portion 26a and the second resin impregnation portion 26b are formed. Thus, in the sixth embodiment, the same advantages as in the case of the fourth and fifth embodiments are obtained.

Figure 16:
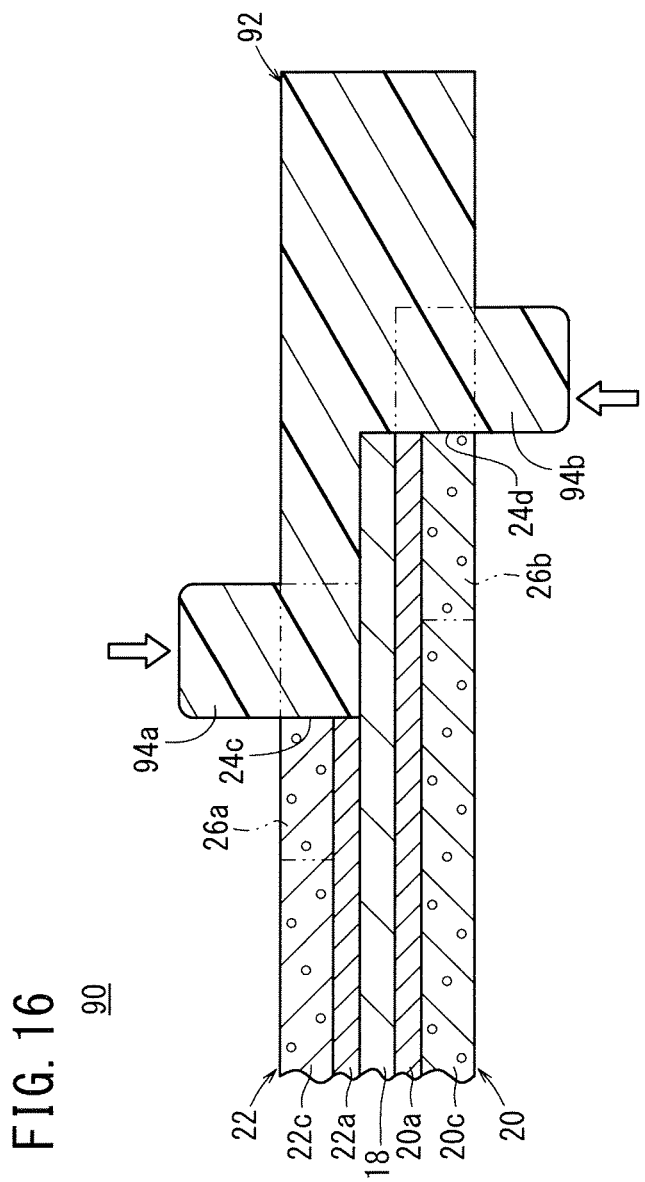
FIG. 16 is a cross sectional view showing main components of a membrane electrode assembly according to a seventh embodiment of the present invention.

FIG. 16 is a cross sectional view showing a membrane electrode assembly 90 according to a seventh embodiment of the present invention.

The membrane electrode assembly 90 includes a resin frame member 92 joined to the cathode 22 and the anode 20. A first resin protrusion 94a and a second resin protrusion 94b are provided integrally with the resin frame member 92 for combining the resin frame member 92 and the gas diffusion layer 22c of the cathode 22 into one piece, and combining the resin frame member 92 and the gas diffusion layer 20c of the anode 20 into one piece.

The first resin protrusion 94a is formed in a frame shape around the first inner circumferential portion 24c, and the second resin protrusion 94b is formed in a frame shape around the second inner circumferential portion 24d.

Each of the first resin protrusion 94a and the second resin protrusion 94b has a rectangular shape in cross section. In effect, the first resin protrusion 94a and the second resin protrusion 94b are formed by eliminating the inclined surfaces 74as, 74bs of the first resin protrusion 74a and the second resin protrusion 74b in the membrane electrode assembly 70 according to the fifth embodiment.

In the seventh embodiment, the first resin protrusion 94a and the second resin protrusion 94b are heated by a heating machine (not shown), and melted. By applying a load to the first resin protrusion 94a and the second resin protrusion 94b, the gas diffusion layers 22c, 20c are impregnated with the melted resin of the first resin protrusion 94a and the second resin protrusion 94b. In this manner, the first resin impregnation portion 26a and the second resin impregnation portion 26b are formed.

Thus, in the seventh embodiment, the same advantage as in the case of the fourth to sixth embodiments are obtained. Further, in particular, operation of producing the first resin protrusion 94a and the second resin protrusion 94b can be carried out simply.

Figure 17:
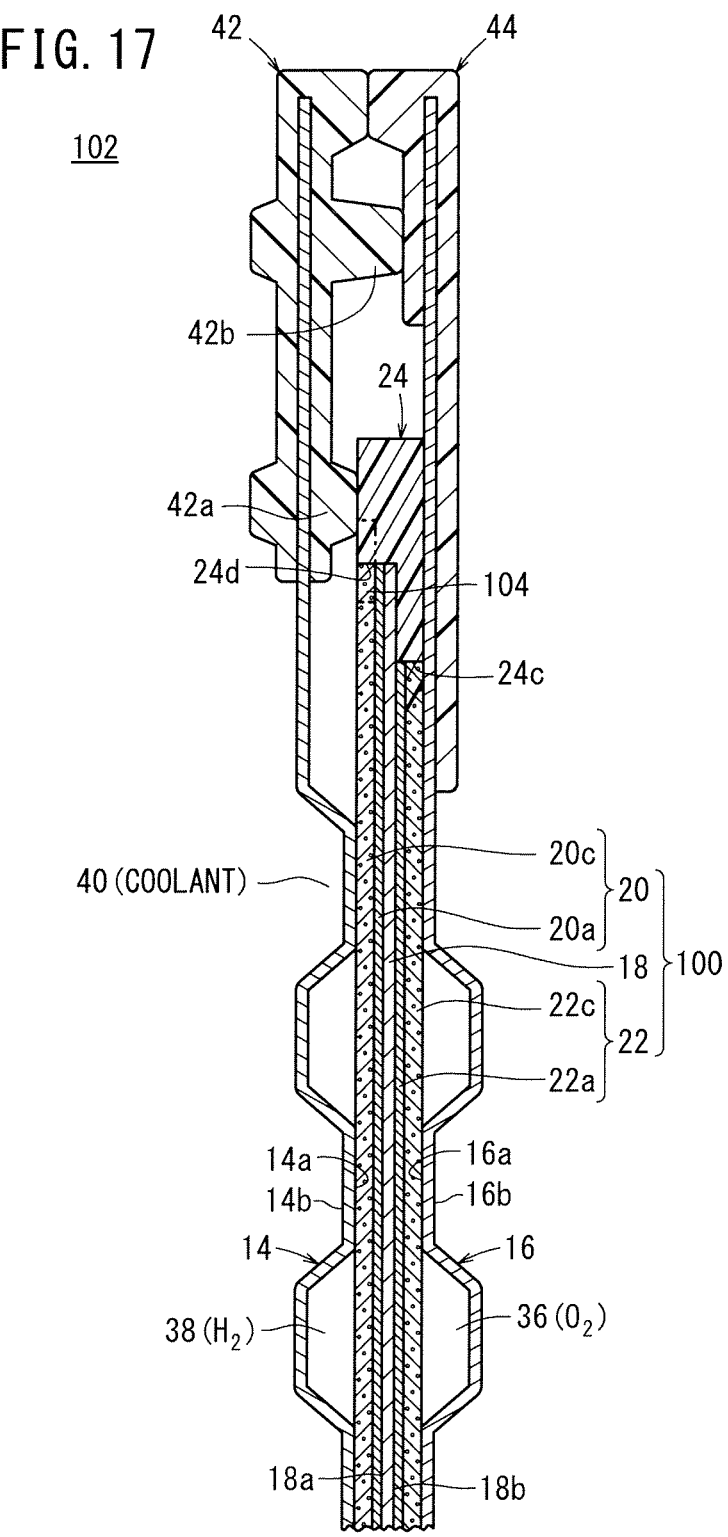
FIG. 17 is a cross sectional view showing a solid polymer electrolyte fuel cell including a membrane electrode assembly according to an eighth embodiment of the present invention.

FIG. 17 is a cross sectional view showing a solid polymer electrolyte fuel cell 102 including a membrane electrode assembly 100 according to an eighth embodiment of the present invention.

In the membrane electrode assembly 100, the resin frame member 24 and the gas diffusion layer 20c of the anode 20 are combined into one piece by a resin impregnation portion 104. That is, the resin frame member 24 is joined only to the anode 20 which is larger than the cathode 22.

Figure 18:
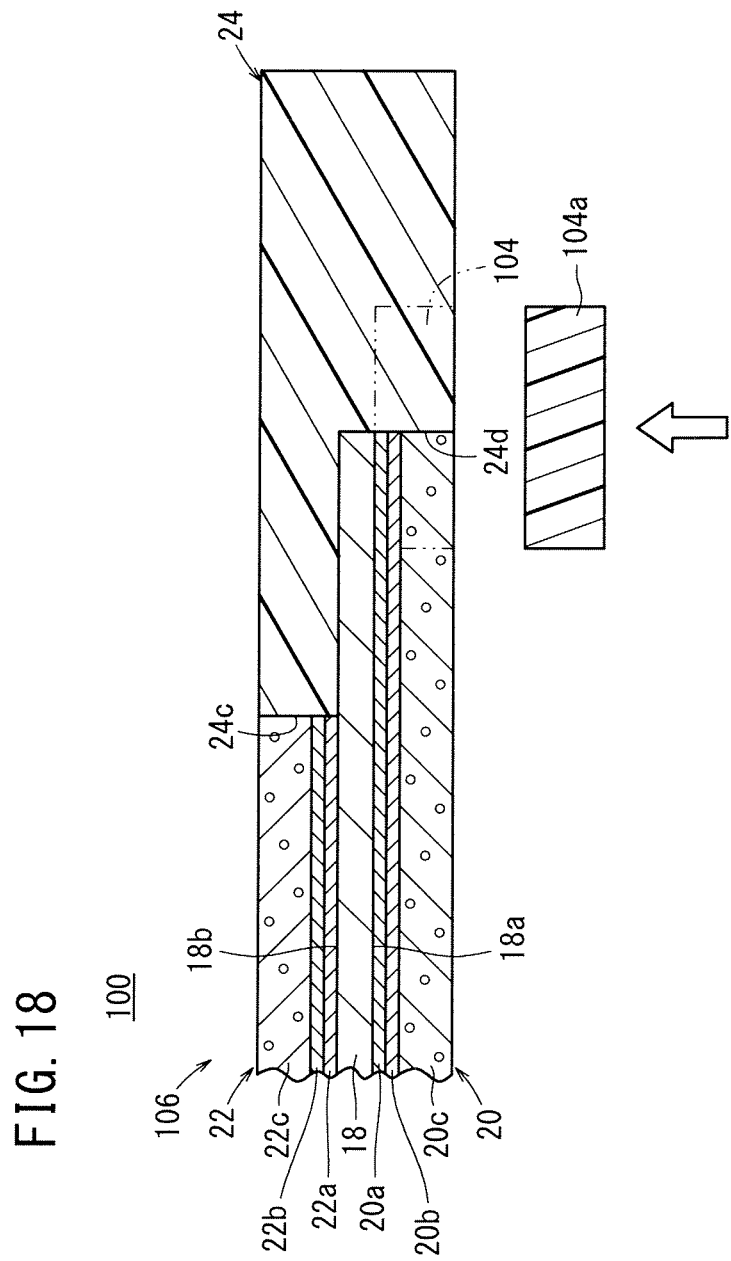
FIG. 18 is a view showing a method of producing the membrane electrode assembly.
Figure 19:
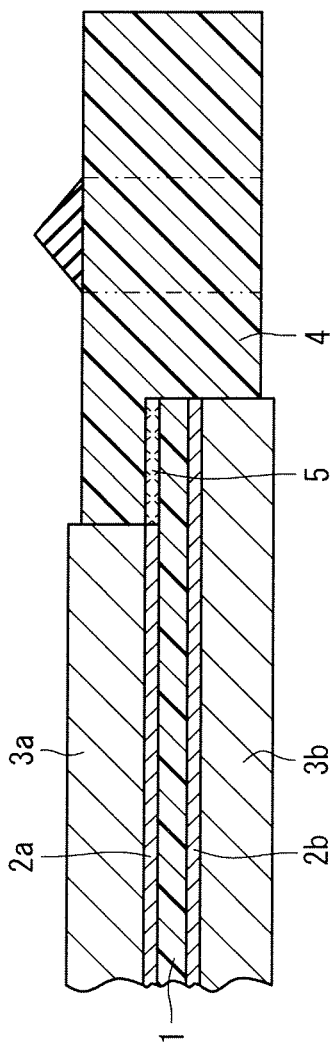
FIG. 19 is a view showing a membrane electrode assembly disclosed in Japanese Laid-Open Patent Publication No. 2007-066766.

At the time of producing the membrane electrode assembly 100, as shown in FIG. 18, an MEA 106 having different sizes of components (stepped-type MEA) of the membrane electrode assembly 100 is produced. In the state where the resin frame member 24 and the MEA 106 are positioned with respect to each other, a resin member 104a for forming the resin impregnation portion 104 is prepared. The resin member 104a has a frame shape, and uses resin material enforced by mixing a glass filler with the resin material.

Then, in the state where the resin member 104a is placed, and a load is applied to the MEA 106 and the resin frame member 24, the resin member 104a is heated. Thus, the heated resin member 104a is melted to form the resin impregnation portion 104 over the gas diffusion layer 20c of the anode 20 and the resin frame member 24. In this manner, the membrane electrode assembly 100 is produced.

In the eighth embodiment, when the resin member 104a is heated, and melted, the glass filler does not enter the gas diffusion layer 20c. Therefore, the resin member 104a does not directly contact the solid polymer electrolyte membrane 18.

Further, when the resin member 104a is melted at high temperature, the gas diffusion layer 20c and the electrode catalyst layer 20a, and in certain cases, an intermediate layer 20b are present between the solid polymer electrolyte membrane 18 and the resin member 104a. Thus, thermal effect on the solid polymer electrolyte membrane 18 is reduced.

Accordingly, as the resin member 104a, it become possible to adopt resin mixed with a glass filler, and use resin having high melting temperature. Thus, the resin used for the resin member 104a can be adopted from a wide variety of selection advantageously.

What is claimed is:

1. A method of producing a fuel cell membrane electrode assembly, the membrane electrode assembly comprising a solid polymer electrolyte membrane and a first electrode and a second electrode provided on both sides of the solid polymer electrolyte membrane, the first electrode and the second electrode each including an electrode catalyst layer and a gas diffusion layer, an outer size of the first electrode being smaller than an outer size of the second electrode, the method comprising the steps of:

forming the first electrode and the second electrode on both sides of the solid polymer electrolyte membrane;

providing a resin frame member, said resin frame member integrally including an outer end, an inner extension and a protrusion made of resin, a thickness of the inner extension being smaller than a thickness of the outer end, the inner extension being provided close to one surface of the resin frame member in a thickness direction of the resin frame member, the protrusion made of resin protruding alone the thickness direction of the resin frame member from another surface of the resin frame member at a position between the inner extension and the outer end;

overlapping an outer marginal portion of the membrane electrode assembly comprising the solid polymer electrolyte membrane and the first electrode and the second electrode and inner extension of the resin frame member with each other; and applying heat and pressure to the protrusion made of resin to melt the protrusion made of resin into the outer circumferential portion of the second electrode, to join the second electrode to the resin frame member through an impregnation portion formed by deforming the protrusion made of resin in the outer circumferential portion of the second electrode.

2. The method of producing a fuel cell membrane electrode assembly of claim 1, wherein the protrusion made of resin is a first protrusion, and the step of providing a resin frame member includes providing the resin frame member includes providing the resin frame member with another protrusion made of resin that is integral with the resin frame member as a second protrusion.

3. The method of claim 2 wherein the first protrusion and the second protrusion combine the resin frame member and the gas diffusion layer of the first electrode into one piece, and combine the resin frame member and the gas diffusion layer of the second electrode into one piece.

* * * * *